United States Patent [19]

Ehrhart et al.

[11] 4,112,621
[45] Sep. 12, 1978

[54] ADJUSTABLE THICKNESS VENT DOOR ASSEMBLY FOR CARGO BODIES

[75] Inventors: Leonard M. Ehrhart, Country Club Hills; John R. Pratte, Naperville; Paul E. Mazik, Jr., Chicago, all of Ill.

[73] Assignee: Pullman Incorporated, Chicago, Ill.

[21] Appl. No.: 801,199

[22] Filed: May 27, 1977

[51] Int. Cl.² ............................................. E05D 7/00
[52] U.S. Cl. .................................... 49/400; 49/501; 49/505
[58] Field of Search .................... 49/505, 400, 401

[56] References Cited

U.S. PATENT DOCUMENTS

| | | | |
|---|---|---|---|
| 1,050,924 | 1/1913 | Dowd | 49/505 |
| 3,055,969 | 9/1962 | Schaller, Jr. | 49/401 X |
| 3,130,651 | 4/1964 | Werner | 49/400 |

*Primary Examiner*—Kenneth Downey
*Attorney, Agent, or Firm*—Thomas C. Anderson

[57] ABSTRACT

A vent door and frame assembly for cargo bodies includes a pair of rectangularly shaped frame members one of which defines a door frame opening and supports in hinged relation a vent door. The frame members during assembly with a wall construction are positionable in telescoping relation wherein they overlap opposite sides of a cargo body and when in this position form a permanent frame structure connected to the sides of the body. By virtue of the telescoping relationship of the frame parts the frame assembly is adapted to be readily utilized with cargo bodies having walls of different thickness.

1 Claim, 3 Drawing Figures

U.S. Patent
Sept. 12, 1978
4,112,621
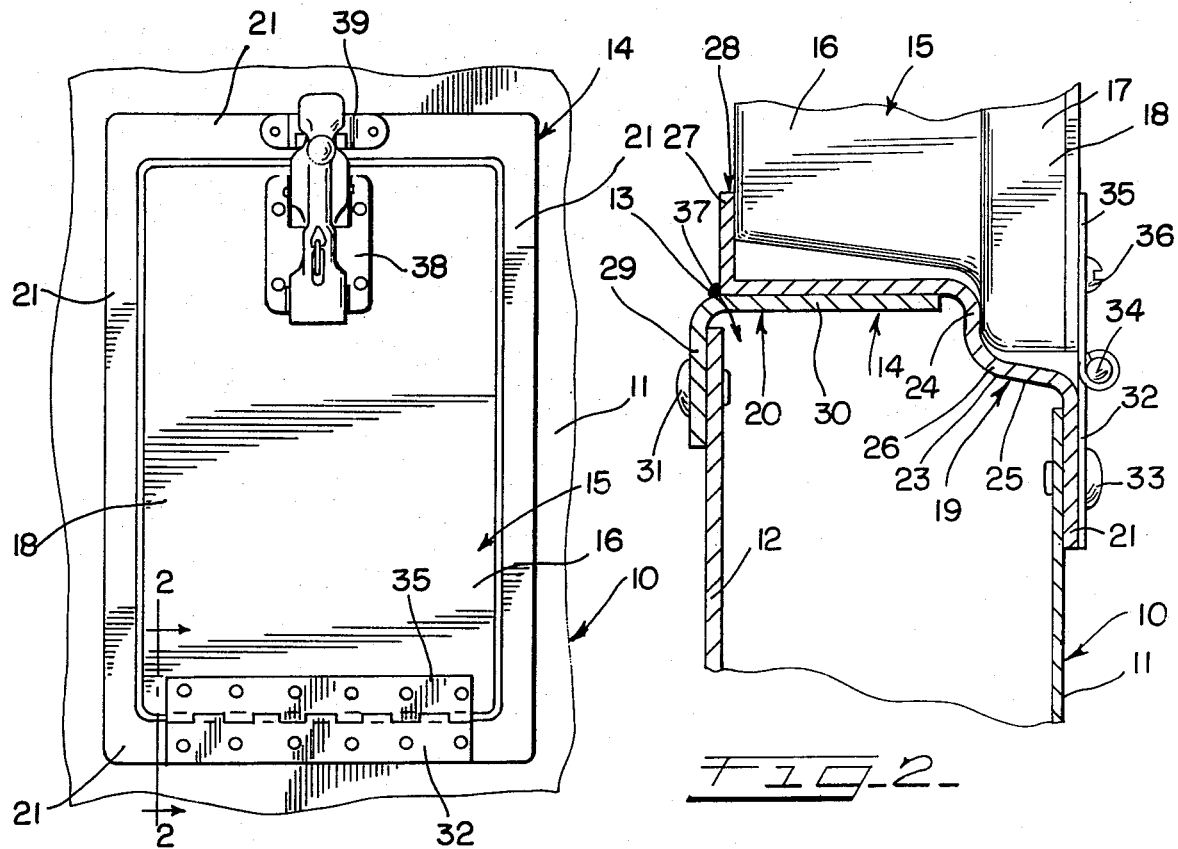
Fig. 1.
Fig. 2.
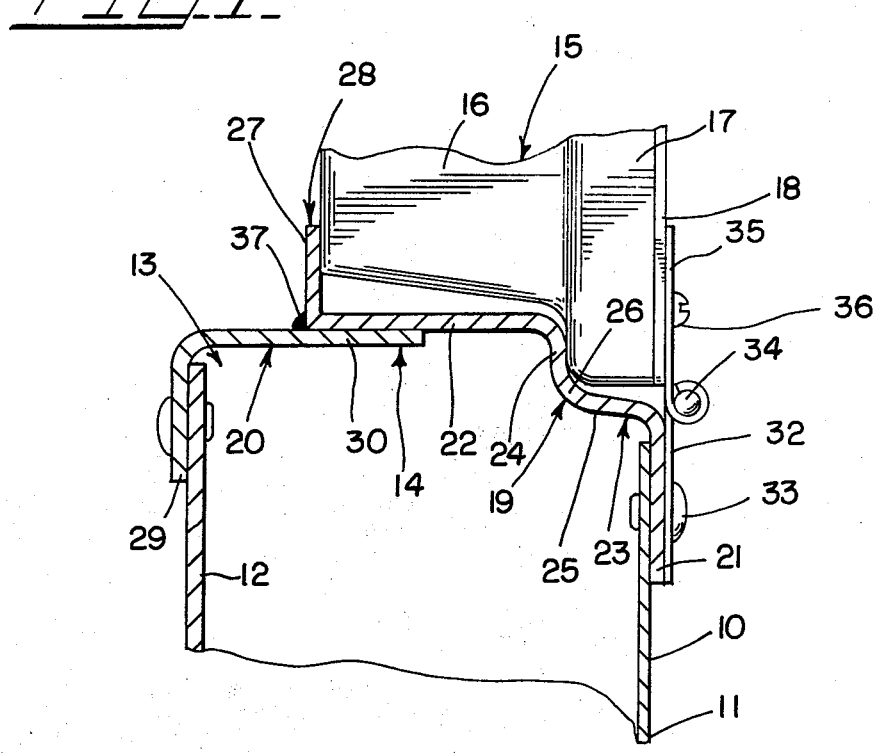
Fig. 3.

ADJUSTABLE THICKNESS VENT DOOR ASSEMBLY FOR CARGO BODIES

BACKGROUND OF THE INVENTION

1. Field of the Invention

The present invention relates to vent door assemblies for cargo bodies such as containers, trailers, etc. It particularly relates to refrigerated cargo bodies.

2. Description of the Prior Art

Similar constructions of the prior art are best exemplified in U.S. Pat. Nos. 2,970,347 Feb. 7, 1961; 3,094,058 June 18, 1963; 3,757,473 Sept. 11, 1973; and 3,952,542 Apr. 27, 1976. The present invention is an improvement over the patents of the prior art.

SUMMARY OF THE INVENTION

In cargo transport bodies such as refrigerated trailers and containers, the construction generally consists of spaced sheet metal walls which are filled with suitable insulation. Bodies of this type also include openings through the side walls within which a frame is positioned and which incorporates a vent opening and door assembly. The frame and door assembly is generally of a rectangular configuration and is suitably installated to conform to the panelled construction. Generally, however, different types of cargo bodies have a different width wall spacing. Thus, in most instances of the prior art it has been necessary to provide for a number of different door frames having different cross-sectional width in order to accommodate the difference in sizes of the spacing of the panelled wall construction. The present invention obviates the necessity for such variations in frames in that the present frame is adjustable so that it may readily fit and be assembled with cargo bodies having different wall spacings.

In the present invention a vent door assembly comprises a frame consisting of a pair of frame members adapted to be connected together in relative telescoping relation. One of the frame members comprises a first flange which is connected to the outer wall side of a cargo body and includes a second flange which extends laterally across to the other side of the cargo body wall. The second flange includes an upwardly extending third flange having edges disposed in rectangular fashion to provide a door opening in the frame which is suitably closed and opened by means of a door comprised primarily of a polyurethane construction. The second frame also includes a flange which extends transversely with respect to the outer wall panel and is disposed relative to the second flange in relative telescoping and sliding relation. The second frame further includes another flange extending in the same general direction as the first flange and which overlaps the inner side wall of the cargo body. Because of the telescoping feature and the positioning of the frame members, they may be adapted to fit a variety of different paneled wall constructions having different thicknesses. Once assembled within the opening of the walls, the door and frame construction is fixed in position by sliding the telescoping flanges together, sealing the resultant joint, and riveting the other flanges to the outer side portions of the paneled wall construction.

BRIEF DESCRIPTION OF THE DRAWINGS

FIG. 1 is an elevational view looking at the outer wall of a cargo body incorporating a door and frame assembly for a vent opening;

FIG. 2 is a cross-sectional view taken substantially along the line 2—2 of FIG. 1;

FIG. 3 is a cross-sectional view similar to FIG. 2 showing the door and door frame adapted and connected to a cargo body having a wider wall spacing.

DESCRIPTION OF THE PREFERRED EMBODIMENT

Referring to the drawings, a cargo body is generally designated by reference character 10 and comprises an outer panel type wall 11 and a spaced inner panel type wall 12. The walls indicated extend vertically around the cargo container or trailer body supported on a floor and covered by a conventional roof.

The spaced wall construction provided for the containment of suitable insulation such as polyurethane etc. and the cargo body may be refrigerated. The panel walls 11 and 12, during construction of the cargo body, are suitably apertured to provide an opening 13 which will support a vent door and frame construction which is assembled to the cargo body after the walls have been placed in position with their lateral spacing fixed.

A door frame 14 includes a door 15 which is to be assembled through the opening 13 provided in the panel wall construction. The door 15 includes a base 16 comprising a generally rectangular block of polyurethane foam having at one end of the base 16 an enlarged projecting ledge portion 17 extending about the base. The base 16 and ledge 17 are suitably secured to an aluminum sheet 18 trimmed to conform to the outer face of the base. The door comprises frame portions 19 and 20. The frame portion 19 comprises a first flange 21 extending in rectangular fashion about the door 15 as best shown in FIG. 1. A second flange 22 is connected to and is co-extensive with the first flange 21 and extends laterally inwardly toward the panel wall type 12. The second flange 22 is connected to the first flange 21 by means of an offset corner portion generally designated at 23. The offset corner portion 23 comprises a first flange portion 24 extending laterally relative to the flange 22 and is connected to a second flange portion 25 extending laterally from the flange 21 by means of arcuate flange portion 26. Thus as shown in FIGS. 2 and 3 the offset corner portion 23 provides an inset seat for accommodating the enlarged ledge 17 of the door 15 in relatively flush or recessed relation with respect to the wall 11 and first flange 21.

The second flange 22 is provided at its extremity and junctures with a third flange 27 extending perpendicular to the flange 22 and providing at its ends an opening 28 in the door frame 14. In the position shown in FIGS. 2 and 3 of the door 15 the opening 28 is closed or blocked by means of the door base 16.

The door frame portion 22 is provided with a fifth flange 30 and a laterally extending flanges 29 which overlaps the wall 12 and is connected thereto by means of rivets 31. The outer or first flange 21 is also suitably connected and overlaps the wall 11 by means of rivets 33.

The door 15 is hingedly connected to the outer wall panel 11 by means of a hinge portion 32 having a hinged connection 34 with a hinge portion 35 which is in turn connected to the door 15 by means of fasteners 36. As shown the disposition of the flanges 22 and 30 are such that they are in relatively telescoping relation and can be moved from the position of FIG. 2 wherein the cargo body has a narrow wall construction to accommodate the wider wall construction shown in FIG. 3. Sealing is indicated at 37 at the juncture of the flange 27 and the flange 22 so that the spacing of the frame portion becomes fixed and a secure construction results after the frame assembly has been secured in position by the rivets 31 and 33.

The door 15 is provided at its upper end with a suitable conventional latch construction 38 releaseably adapted to engage a keeper 39, the assembly functioning to releaseably lock the door in the closed position indicated.

During the assembly of the door frame and door with the body of the trailer, the frame portions 19 and 20 are inserted from opposite sides of the panel wall construction into the position indicated in FIGS. 2 and 3. The flanges 21 and 29 are secured to the outer faces of the walls 11 and 12 and the operator merely seals the flanges 22 and 30 as indicated at 37 thereby securing the vent assembly in position.

Thus it is apparent that by virtue of the novel telescoping construction of the door frame, the same frame may be utilized for paneled wall constructions having different thickness. This then eliminates the necessity of having various door frames of different construction for different thickness of trailer or cargo bodies.

What is claimed is:

1. In a cargo transporting body having a wall construction including an opening, said wall construction including parallel opposite wall sides having a certain cross-sectional dimension, the improvement of a door and frame assembly for said opening, said arrangement being adapted for assembly with walls of different cross-sectional dimensions, comprising:

a door of relatively constant thickness dimensions having first and second parallel door side walls, a door frame extending about said door including a first angle shaped frame part having a first flange extending outwardly of said door being substantially flush with a first door side wall, means hingedly connecting said first flange to said first door side wall, a second flange extending perpendicular to and connected to said first flange, said second flange extending toward said second door side, a third flange connected to said second flange and extending in a direction inwardly toward and overlapping said second door side, a second angle shaped frame part having a fourth flange extending in the direction of said first flange, a fifth flange connected to said fourth flange extending perpendicular to said fourth flange and overlapping said second flange, means connecting said first and fourth flanges respectively to said opposite wall sides in overlapping relation, means interconnecting said second and fifth overlapping flanges, said body wall construction including panel type walls, said third flange having a continous edge portion forming a second opening defined by said door frame, said door including a base portion in a closed position engaging said third flange to block said second opening, an outwardly projecting ledge portion on said base, an offset corner portion connecting said first and second flanges, providing a recess on said frame for seating said ledge in substantially flush relation relative to said wall construction, said corner portion including a flange portion extending laterally with respect to said second flange, a second flange portion extending laterally with respect to said first flange, an arcuate flange portion connecting said first and second flange portions, and said hinge means having a hinge axis substantially in lateral alignment with said second flange portion in opposing relation to said arcuate flange portion.

* * * * *